Nov. 11, 1958

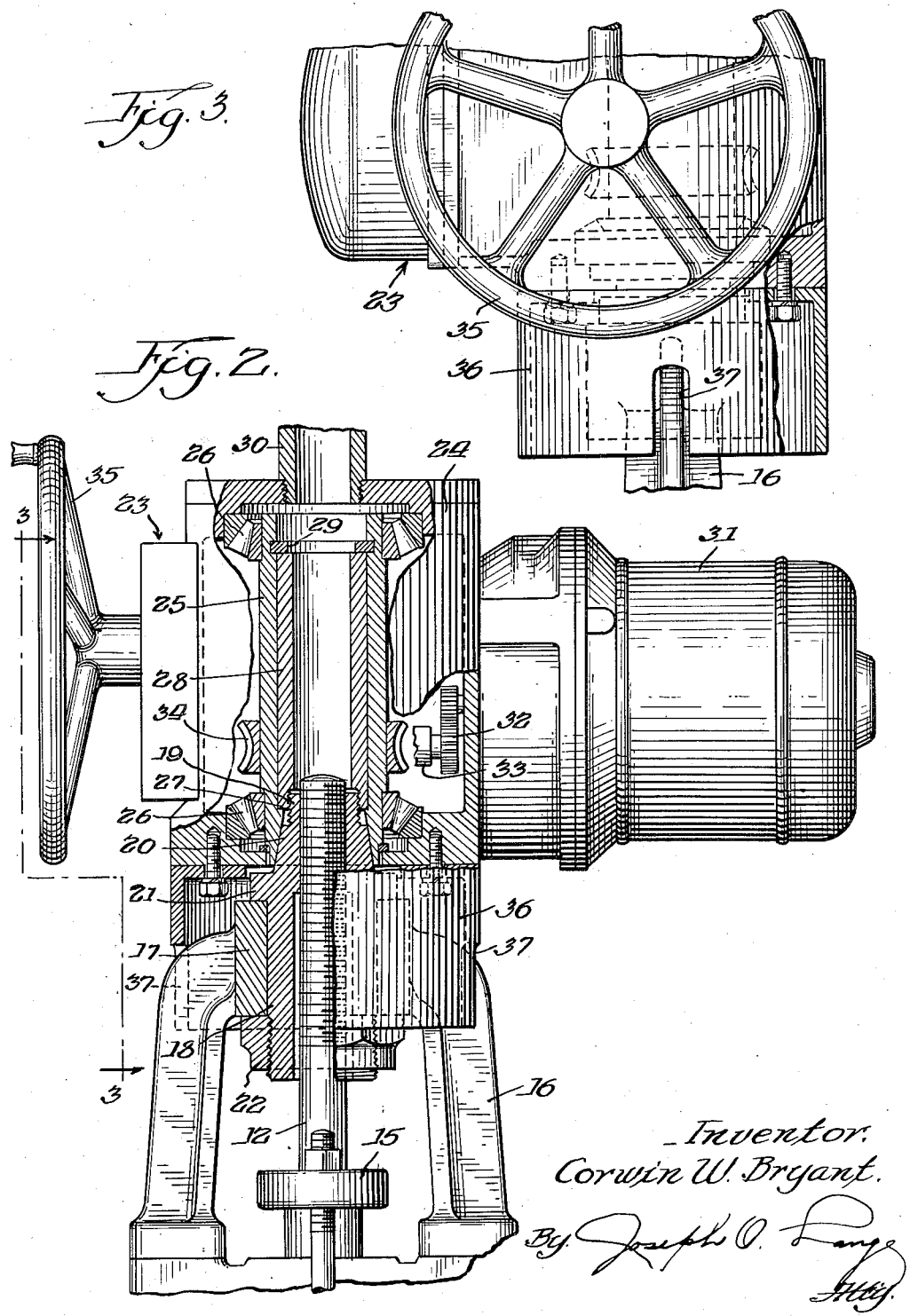

C. W. BRYANT 2,859,639

MANUAL VALVE ADAPTER

Filed Oct. 21, 1955

United States Patent Office 2,859,639
Patented Nov. 11, 1958

2,859,639

MANUAL VALVE ADAPTER

Corwin W. Bryant, Downers Grove, Ill., assignor to Crane Co., Chicago, Ill., a corporation of Illinois Application October 21, 1955, Serial No. 541,950

12 Claims. (Cl. 74—625)

The present invention relates to the adaptation of manually operated valves to power operation, and more particularly to an adapter construction for converting hand-operated valves to operation by power units in the field without requiring dismantling.

The conversion of hand-operated valves in already existing installations to power operation presents a problem in the field in that the valves must be at least partially dismantled in order to replace the manual operating means with a motor-driven or other power unit, requiring shutting down of the line and thus interrupting operation. The mounting of such units on valves in the field also involves the application of flanges or similar means to the valve yoke for the securement of such units, which in the field presents great difficulties in achieving the precise alignment necessary for proper valve operation. The present invention solves these difficulties by providing for adaptation of manual valves to power operation in a very simple and easy manner without removal or dismantling or the application of mounting flanges and yet with proper alignment and mounting of the power units.

It is an object of the invention to provide an adapter construction for converting a manually operated valve to operation by power means.

Another object is the provision of an adapter arrangement for relatively convenient conversion of a hand-operated valve to power means operation requiring no mounting means application and a minimum of dismantling.

Another object is the provision of an adapter arrangement for converting a manual valve to power operation requiring only removal of the hand operating means for mounting of power means.

A further object of the invention is the provision of an initially hand-operated valve converted to power operation utilizing substantially all of the original valve structure.

Still another object is the provision of an adapter arrangement for converting a manually operated valve to power operation which requires a minimum of modification of the valve construction to mount power means thereon.

It is also an object of the invention to provide a simple method of adapting a hand-operated valve to power operation which may conveniently and effectively be carried out in the field with minimum equipment.

Other and further objects, advantages and features will become apparent from the following description read in the light of the accompanying drawings, in which Fig. 1 is an end elevational view of a hand-operated valve converted to power operation in accordance with the present invention;

Fig. 2 is an enlarged view, with parts broken away for clearness, of a portion of the construction shown in Fig. 1;

Fig. 3 is a side elevational view of the structure shown in Fig. 2 taken from the left side thereof as indicated by the line 3—3.

Figure 1:
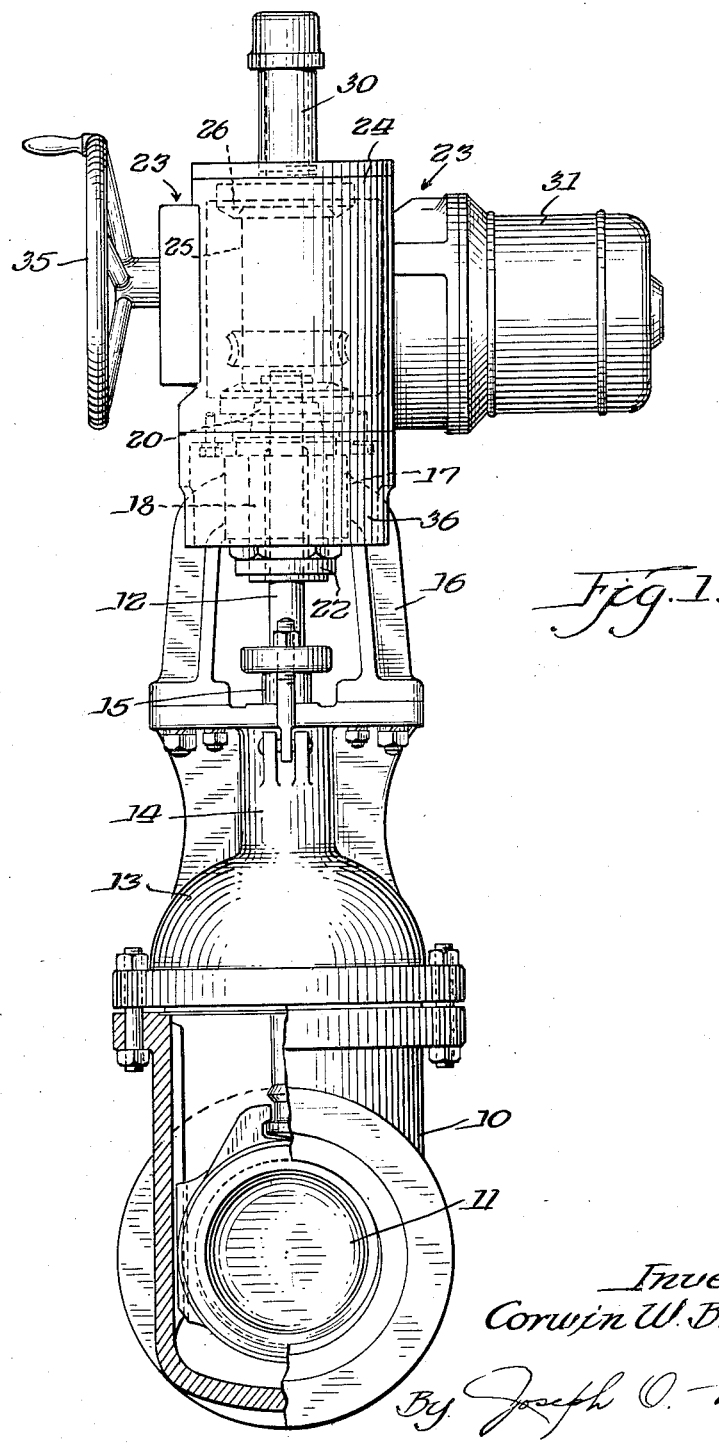

Referring first to Fig. 1 of the drawings, there is shown a conventional gate valve having a body 10 in which is a reciprocally movable disc gate 11 operatively connected to a threaded stem 12 extending through the bonnet 13 secured on the body and having a stuffing box 14 in which stem packing is compressed by the gland 15. Secured on the bonnet is a yoke 16 with a hub 17 apertured for passage of the stem 12. An internally threaded valve yoke sleeve 18 is rotatably mounted in the hub and operatively receives the threaded portion of the stem. As best shown in Fig. 2, the yoke sleeve projects beyond both faces of the hub 17 and has at one end a reduced externally threaded portion 19 adjacent which is a tapered hexagonal portion 20 by which the yoke sleeve is rotated. The yoke sleeve 18 is held against axial movement in the hub by a collar 21 adjacent the hexagonal portion and a retaining nut 22 on the other end.

The construction so far described is that of a generally conventional hand operated valve which may be adapted to power operation according to this invention. Such a valve has a handwheel (not shown) with a hub socketed to nest over the hexagonal portion 20 of the yoke sleeve 18, and secured by a nut on the reduced threaded end 19 of the sleeve. To change the valve for power operation, the handwheel is removed and a power unit applied to operate the valve as shown in Figs. 1 to 3. A power unit 23 of one known type comprising a casing 24 enclosing operating mechanism only a portion of which is illustrated herein, is shown in the drawings as mounted in operative relation with the valve. A hollow drive sleeve 25 is rotatably mounted in the casing by thrust bearings 26 adjacent its opposite ends which hold the sleeve against axial movement. At one end, the sleeve 25 has a tapered hexagonal socket to engage on the hexagonal yoke sleeve 20 in driving relation, the base of the casing being apertured to allow for projection of the yoke sleeve therethrough. Inwardly of the socket portion, the drive sleeve is provided with an internal shoulder 27 on which engages one end of a retaining sleeve 28 disposed within the drive sleeve which is threaded on the end portion 19 of the yoke sleeve to hold the drive sleeve in position. The retaining sleeve is held against loosening as by a locking ring 29 engaging its opposite end and snapping into a groove in the inner surface of the drive sleeve. The inner diameter of the retaining sleeve is sufficient to pass the valve stem 12, which may project into a stem shield or enclosure 30 extending from the casing 24 opposite the aperture in the base. In the present instance, an electric motor 31 is employed to drive the mechanism of the unit, although the power unit may be otherwise operated, as, for example, by manual force applied through suitable gearing. The motor, through intermediate gears 32, drives the shaft 33 of a worm (not shown) engaging with a worm gear 34 clutchable to the drive sleeve 25 to rotate the sleeve and thereby the yoke sleeve 18, thus operating the valve. As is common practice with such power units, a handwheel 35 is provided for operating the valve manually when desired, the wheel turning the drive sleeve through means not herein illustrated because well known in the art. It will be seen that a unitary driving sleeve structure is provided including the drive sleeve 25 and the yoke sleeve 18, and that the power unit 23 is mounted and supported directly on the yoke sleeve. The arrangement assures proper alignment of the respective stem and drive sleeve axes and holds the power unit against axial movement while eliminating any need for welding or otherwise applying a mounting plate or flange to the yoke for securement of the power unit.

A mounting adapter 36 is provided, however, to prevent the possibility of rotation of the power unit on the yoke. The adapter comprises a base plate with a circular flange or skirt formed with slots 37. The base plate is bolted to the base of the power unit casing 24 on a predetermined bolt circle so that the adapter is rigid therewith, the skirt extending therefrom sufficiently to have the arms of the yoke 16 engaged in the slots 37 so that the unit 23 is held in non-rotative relation to the yoke.

Figure 4:
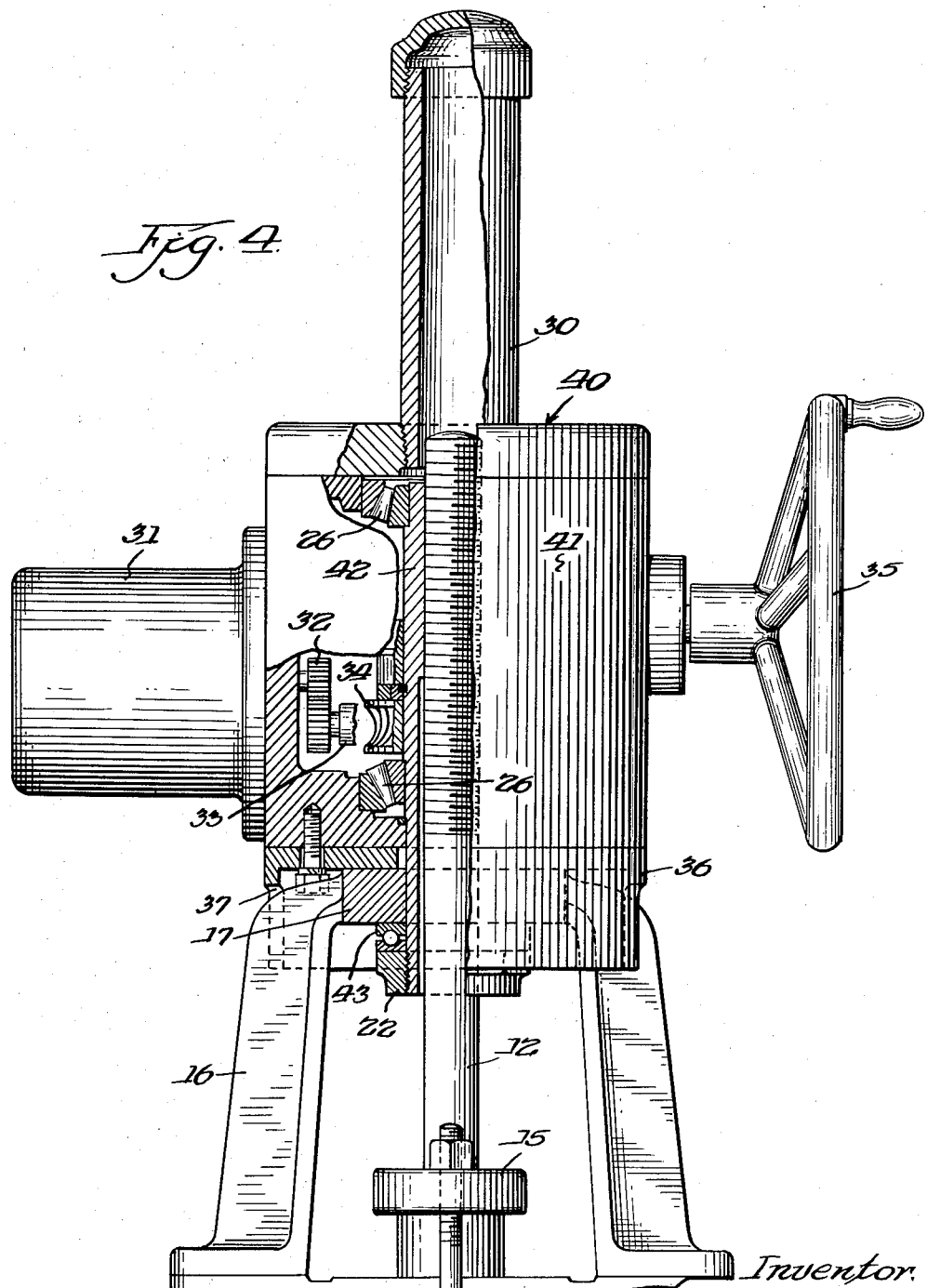
Fig. 4 is a view similar to Fig. 2, but showing a somewhat different embodiment of the invention.

In Fig. 4, the invention is illustrated as incorporated in a somewhat different construction from that shown in Figs. 1 to 3. The valve body and bonnet are omitted in this figure but the valve yoke 16 with its hub 17 is shown, the valve stem 12 extending therethrough. A power unit 40 generally similar to the unit 23 previously described is provided having operating mechanism in a casing 41, but instead of employing a drive sleeve which engages with the yoke sleeve, makes use of an internallly threaded drive sleeve 42 rotatably mounted in the casing 41 of the unit by thrust bearings 26 and extending through an aperture in the base of the unit so that it may project through the yoke hub 17. The stem 12 is operatively engaged within the sleeve. A retaining nut 22 is threaded on the projecting end of the sleeve 42 to secure it against axial movement in the hub. In this case, a thrust bearing 43 is shown as disposed between the nut and the hub. The drive sleeve is provided with a worm gear 34 which may be clutched thereto, and which engages with a worm (not shown) on a shaft 33 driven through intermediate gears 32 by the motor 31 substantially as in the previously described construction. A handwheel 35 is provided as a part of the unit 40 for manual operation of the drive sleeve 42 by suitable gearing or similar means, as in the case of the power unit 23. The drive sleeve by its rotation operates the stem to open or close the valve. As in the case of the valve of Fig. 2, the stem may rise into the stem protector 30 projecting from the casing 41.

In mounting the power unit 40, the handwheel and the yoke sleeve of the hand operated valve are removed and the drive sleeve 42 is engaged with the stem 12 so as to project through the yoke hub 17, and then secured as already described. It will be noted that the power unit is mounted on the valve by the drive sleeve 42, substantially as the power unit 23 is mounted by the unitary drive sleeve structure provided by the drive sleeve 25 and yoke sleeve 18. The adapter 36 is secured to the base of the casing 41 as in the case of the casing 24, with the slots 37 in the adapter skirt engaging over the arms of the yoke 16 to prevent rotation of the unit.

As has already been indicated, the invention is not limited to application in the case of motor-driven power units only, but may be employed with units which are operated by manual means driving the stem through gears or other intermediate means providing some mechanical or other advantage. Similarly, although the invention is illustrated as employed with a gate valve, it will be clear that other types of valves may utilize the invention, and it may further be pointed out that the invention is not limited to use with valves of the rising stem type, such as illustrated herein. In appropriate cases, a thrust bearing may be employed between the retaining nut 22 and yoke hub 17 in the instances where the valve yoke sleeve is utilized as shown in Fig. 2. Any suitable oil seal may be employed between the driving sleeve and the casing to retain lubricant therein. It is also pointed out that while the valve yoke sleeve 18 is shown as retained by means of the collar 21 and the nut 22, in which case a solid or one-piece yoke may be employed, the yoke sleeve may have instead a pair of spaced retaining collars, with the yoke in such case being of split formation. Stop or rotation-preventing means other than the adapter 36 may of course be employed.

It should be obvious that various structural arrangements other than those specifically shown and described may be employed to achieve the desired result without departing from the spirit and scope of the invention.

I claim:

1. An adapter structure for conversion of a manually-operated threaded-stem valve having a stem-guiding yoke to operation by a power unit including drive means and having a base for engagement on the valve yoke, comprising stop means securable to the power unit base for engagement with the yoke in non-rotative relation, a unitary drive sleeve structure rotatable by said drive means threadedly engageable with the valve stem having a portion disposed in the power unit and a portion disposable in the yoke, means for securing the sleeve structure against axial movement in the power unit, and means for securing the sleeve structure against axial movement in the yoke.

2. An adapter structure for conversion of a hand-operated threaded-stem valve having a stem-guiding yoke to operation by a power unit including driving means, comprising stop means securable to said unit for rotation-preventing engagement with said yoke, a unitary drive sleeve structure rotatable by said driving means operatively engageable with the valve stem having a portion in said unit and a portion to extend through the yoke, and means for securing the sleeve structure against axial movement in the unit and yoke.

3. An adapted construction for converting to operation by a power unit having driving means and a base with a central aperture a manually operated threaded-stem valve having a stem-guiding yoke and a threaded yoke sleeve operatively receiving the valve stem rotatably secured in the yoke in axially restrained relation having a non-circular portion projecting from the yoke to extend through said base aperture, comprising stop means securable to the power unit for engagement with the yoke in rotation-preventing relation, a drive sleeve in the unit rotatable by said driving means having a socket portion for receiving said non-circular yoke sleeve portion in driving relation, and retaining means engaging said drive sleeve and secured to said yoke sleeve within the unit to hold the sleeves against relative axial movement.

4. An adapter construction for converting to operation by a power unit having drive means a manually operated threaded-stem valve with a stem-guiding yoke having rotatable therein an axially restrained yoke sleeve operatively receiving the valve stem provided with a portion to project toward the power unit, comprising stop means securable to the power unit for engagement with the yoke in rotation-preventing relation, a drive sleeve in the unit rotatable by said drive means having a portion for engaging in driving relation with said yoke sleeve portion, and means for securing said sleeves to each other in axially fixed relation.

5. An adapter construction for the conversion to operation by a power unit having driving means and a base with an aperture therein of a hand operated threaded-stem valve having a yoke with a stem-receiving aperture alignable with said base aperture, comprising a drive sleeve in the power unit rotatable by said driving means threadedly engageable with the valve stem projecting through said base operative to extend through the yoke aperture, means for securing the drive sleeve against axial movement in the unit and yoke, and stop means securable to the unit base for engaging the yoke to prevent relative rotation of the unit on the yoke.

6. An adapter structure for converting to operation by a power unit having driving means and an apertured base a manually operated threaded-stem valve having a yoke with a stem-receiving aperture alignable with the aperture in said base, comprising a drive sleeve rotatable by said driving means operatively engageable with the valve stem projecting through said base aperture to extend into said yoke aperture, means securing the drive sleeve against axial movement in the yoke and the unit, and stop means securable to the unit for engagement with the yoke in rotation-preventing relation.

7. In a threaded-stem power-operated valve comprising a valve body, a valve member in said body, a threaded stem operatively engaged with said valve member and projecting outwardly of the body, a stem-guiding yoke fixed on the body, a stem-receiving aperture in the yoke, and a power unit having driving means and a base with an aperture coaxial with the yoke aperture, in combination, a unitary drive sleeve structure rotatable by said driving means threadedly engaging the stem and projecting from said unit through said base and yoke apertures, retaining means securing the drive sleeve structure against axial movement in the yoke and unit, and stop means fixed on the unit engaging the yoke in rotation-preventing relation.

8. A valve construction comprising a valve body, a valve member in the body, a stem operatively engaged with the valve member and projecting outwardly of the body, a stem-guiding yoke fixed on the body having a stem-receiving aperture, a power unit having drive means, a unitary drive sleeve structure rotatable by said drive means projecting from said unit into said yoke aperture and operatively engaging said stem, means securing the drive sleeve structure against axial movement in the yoke and unit, and stop means fixed on the unit engaging the yoke in rotation-preventing relation.

9. In a threaded-stem valve comprising a valve body, a valve member in said body, a threaded stem operatively engaged with said valve member and projecting outwardly of the body, a stem-guiding yoke fixed relative to the body having a stem-receiving aperture, a rotatable yoke sleeve threadedly engaging the stem secured against axial movement in said aperture and having a non-circular portion projecting outwardly thereof, and a power unit having driving means and a base with an aperture coaxial with said yoke aperture, a drive sleeve in said unit rotatable by said driving means having a socket portion receiving said non-circular yoke sleeve portion in drive relation and supporting the unit on the yoke sleeve, retaining means holding said sleeves against relative axial movement, and stop means secured on the power unit engaging the yoke to prevent relative rotation.

10. A valve construction comprising a valve body, a valve member in said body, a stem operatively engaged with said valve member and projecting outwardly of the body, a stem-guiding yoke fixed on the body having a stem-receiving aperture, an axially restrained yoke sleeve operatively engaged with the stem rotatably mounted in said aperture and having a portion projecting axially from the yoke, a power unit having driving means, a drive sleeve in said unit rotatable by said driving means having a portion drivingly engaging with said projecting yoke sleeve portion, means securing said sleeves to each other in axially fixed relation, and stop means extending from the unit engaging the yoke in rotation-preventing relation.

11. A threaded-stem valve comprising a valve body, a valve member in said body, a threaded stem operatively engaged with said valve member and projecting outwardly of the body, a stem guiding yoke fixed on the body having a stem-receiving aperture therein, a power unit having driving means and a base with an aperture coaxial with the yoke aperture, a drive sleeve in the control unit rotatable by said driving means operatively engaging the stem and projecting through said apertures, retaining means holding the sleeve against axial movement in said yoke and unit, and stop means fixed on the unit engaging the yoke in rotation-preventing relation.

12. A valve construction comprising a valve body, a valve member in said body, a stem operatively engaged with said valve member and projecting outwardly of the body, a stem-guiding yoke fixed relative to the body having a stem-receiving aperture, a power unit having driving means, a drive sleeve rotatable by said driving means operatively engaged with the stem projecting from the unit into said yoke aperture, means securing the sleeve against axial movement in the yoke and unit, and stop means extending from the unit in rotation-preventing engagement with the yoke.

References Cited in the file of this patent

UNITED STATES PATENTS

| | | |
|---|---|---|
| 2,114,013 | Ball | Apr. 12, 1938 |
| 2,340,999 | Trott | Feb. 8, 1944 |
| 2,724,978 | Morrell | Nov. 29, 1955 |